US007595809B2

(12) United States Patent
Widdowson

(10) Patent No.: US 7,595,809 B2
(45) Date of Patent: Sep. 29, 2009

(54) METHOD AND SYSTEM FOR DETERMINING AN OCCLUSION COST FOR CONCURRENTLY PRESENTING ONE OR MORE IMAGES IN A SHARED VIEWING REGION

(75) Inventor: Simon Widdowson, Dublin, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 311 days.

(21) Appl. No.: 11/127,692

(22) Filed: May 11, 2005

(65) Prior Publication Data

US 2006/0256134 A1    Nov. 16, 2006

(51) Int. Cl.
  *G09G 5/00* (2006.01)
  *G06F 17/00* (2006.01)
(52) U.S. Cl. .................. 345/629; 345/637; 345/619; 345/418
(58) Field of Classification Search ................. 345/629, 345/619, 581, 589, 637, 639, 418
  See application file for complete search history.

(56) References Cited

U.S. PATENT DOCUMENTS

| | | | |
|---|---|---|---|
| 6,636,650 | B1 | 10/2003 | Long et al. |
| 6,727,909 | B1 * | 4/2004 | Matsumura et al. ......... 345/629 |
| 2002/0095439 | A1 | 7/2002 | Long et al. |
| 2004/0165000 | A1 * | 8/2004 | Nagahashi et al. .......... 345/629 |
| 2005/0071781 | A1 | 3/2005 | Atkins |
| 2005/0084136 | A1 * | 4/2005 | Xie et al. ..................... 382/107 |
| 2005/0163344 | A1 * | 7/2005 | Kayahara et al. ............ 382/103 |
| 2006/0070026 | A1 * | 3/2006 | Balinsky et al. ............. 717/106 |
| 2006/0103667 | A1 * | 5/2006 | Amit et al. .................. 345/619 |
| 2006/0230341 | A1 * | 10/2006 | Yamamoto .................. 345/629 |
| 2007/0253028 | A1 * | 11/2007 | Widdowson ............... 358/1.18 |
| 2008/0101761 | A1 * | 5/2008 | Widdowson ................. 386/52 |

FOREIGN PATENT DOCUMENTS

| | | |
|---|---|---|
| EP | 0784294 A2 | 7/1997 |
| EP | 0784294 A3 | 7/1997 |
| EP | 1220531 A2 | 7/2002 |
| EP | 1431921 A2 | 6/2004 |
| EP | 1610542 A1 | 12/2005 |
| WO | WO2005/027504 | 3/2005 |

OTHER PUBLICATIONS

J. Geigel et al., "Using Genetic Algorithms for Album Page Layouts," IEEE Multimedia, IEEE Srvc. Ctr. New York, NY vol. 10, No. 4, Oct. 2003, pp. 16-26.

* cited by examiner

*Primary Examiner*—Chante Harrison

(57) ABSTRACT

Methods and systems for determining an occlusion cost for concurrently presenting multiple images within a shared viewing region are described. Image saliency data is received for a first image to be displayed concurrently with a second image in the shared viewing region. Image saliency data is received for the second image. A layout orientation is received for concurrently presenting the first image and the second image within the shared viewing region. The image saliency data for the first image and the image saliency data for the second image are utilized to determine the occlusion cost of the layout orientation for concurrently presenting the first image and the second image within the shared viewing region.

42 Claims, 14 Drawing Sheets

METHOD AND SYSTEM FOR DETERMINING AN OCCLUSION COST FOR CONCURRENTLY PRESENTING ONE OR MORE IMAGES IN A SHARED VIEWING REGION

CROSS REFERENCE TO RELATED APPLICATIONS

The following patent applications may contain subject matter related to the subject matter of this patent application: U.S. patent application Ser. No. 11/591,345 filed on Oct. 31, 2006 having at least one common inventor and entitled "Weighted Occlusion Costing"; U.S. patent application Ser. No. 11/496,847 filed on Jul. 31, 2006 having at least one common inventor and entitled "Image Layout Constraint Generation"; U.S. patent application Ser. No. 11/414,629 filed on Apr. 28, 2006 having at least one common inventor and entitled "Collage Generation With Occlusion Costing"; U.S. patent application Ser. No. 11/440,736 filed on May 24, 2006 having at least one common inventor and entitled "Templated Collage Generation With Occlusion Costing"; U.S. patent application Ser. No. 11/728654 filed on May 26, 2007 having at least one common inventor and entitled "Image Composition Evaluation"; and U.S. patent application Ser. No. 11/789,201 filed on April 23, 2007 having at least one common inventor and entitled "Temporal Occlusion Costing Applied To Video Editing".

TECHNICAL FIELD

Embodiments of the present invention relate to methods and systems for image analysis, image display, and determining an occlusion cost for displaying one or more images in a viewing region.

BACKGROUND ART

The evolution of automated photo slideshows on personal computers, projected displays, printed media, and entertainment devices has grown stagnant. Display of images is usually limited to a single image in the viewing area at any given time. Transition or animation effects that are arbitrarily applied, such as fade-ins or fade-outs, often accompany display of an image. This procedure for displaying images is not as engaging to the viewer as what is possible to create manually. For instance, a manually created slide show with multiple overlapping images displayed at once is much more interesting, however it is also very time consuming to create. Automating the presentation of multiple overlapping images in a viewing region is not something that is commercially implemented, because of the high opportunity for failure by cutting an interesting portion out of an image, or worse yet, by cutting a critical feature, such as, for example, a face out of an image.

Simply displaying an image centered (or even strategically placed) in a television or video screen can be wasteful of screen space in the viewing region. This is especially true with wide screen and high-definition televisions, since there is much more room and resolution with which to display images as compared to traditional televisions. This also holds true for images in projected viewing regions and in print media viewing regions. Likewise, shrinking multiple images down to display them side by side in a viewing region is also wasteful of viewing region space because it leaves unused area in the viewing region surrounding the images. FIG. 1 is prior art and shows a traditional layout orientation 100 of displaying multiple images (101 and 102) concurrently in a shared viewing region 600.

Such traditional display techniques also tend to be wasteful of image content. For instance, in a given image, there could be an interesting portion of the image and a boring or less interesting portion of the image. If the entire image is displayed, then the same importance is given to displaying both the boring and the interesting portions. Further, when multiple images are displayed concurrently in a viewing region, one image may contain more interesting content than another image. If the interesting image and the boring image are scaled to the same size and displayed side by side, this is wasteful of viewing region space, since unused space will surround the displayed images.

Display in this traditional fashion is also less interesting to the viewer than it could be. For instance, if the boring part of the boring image had been eliminated or minimized while the interesting image had been maximized or more prominently displayed relative to the display of the boring image, the display would be more interesting and less blank space would be left in the viewing region.

Thus current methods of concurrently displaying one or more images have significant disadvantages associated therewith.

DISCLOSURE OF THE INVENTION

A method and system for determining an occlusion cost for concurrently presenting multiple images within a shared viewing region are described. Image saliency data is received for a first image to be displayed concurrently with a second image in the shared viewing region. Image saliency data is received for the second image. A layout orientation is received for concurrently presenting the first image and the second image within the shared viewing region. The image saliency data for the first image and the image saliency data for the second image are utilized to determine the occlusion cost of the layout orientation for concurrently presenting the first image and the second image within the shared viewing region.

BRIEF DESCRIPTION OF THE DRAWINGS

The drawings referred to in this description should not be understood as being drawn to scale unless specifically noted. The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed on computer memory. These descriptions and representations are the means used by those skilled in the image processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system.

Unless specifically stated otherwise as apparent from the following discussions, it is appreciated that throughout the present invention, discussions utilizing terms such as "receiving," "utilizing," "passing," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Computer System

Figure 1:
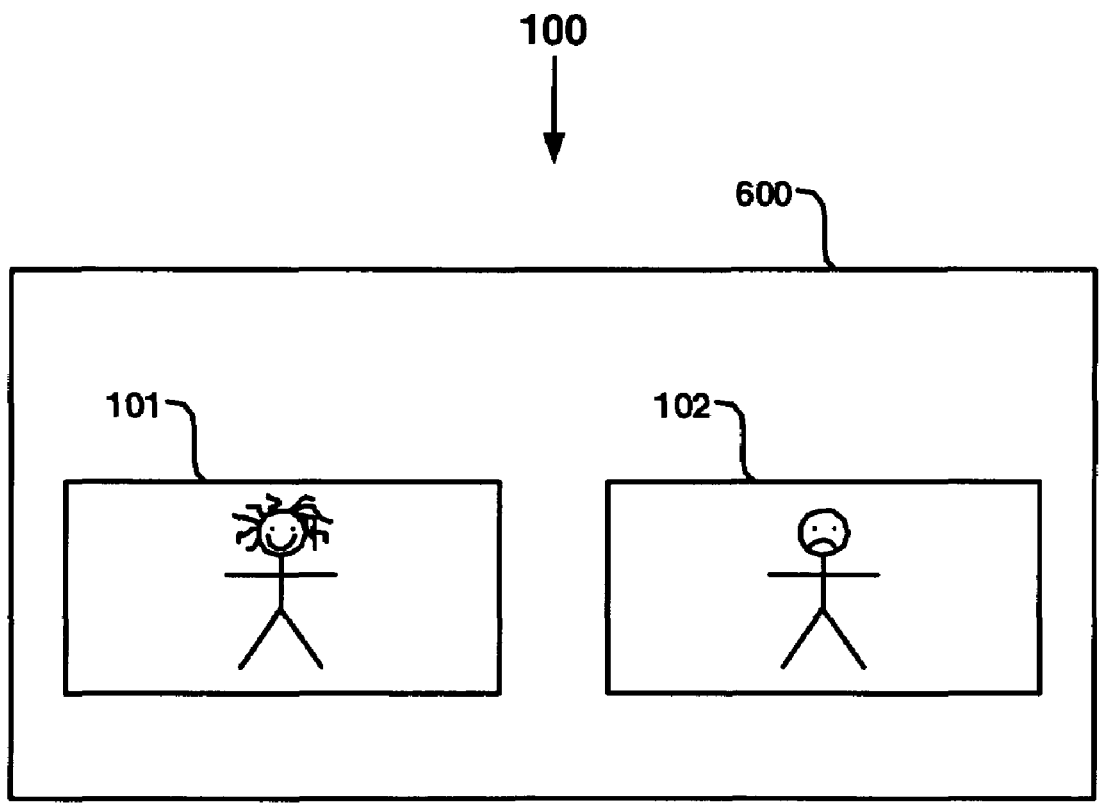
FIG. 1 is an example layout orientation of images concurrently displayed in a shared viewing region according to prior art.
Figure 2:
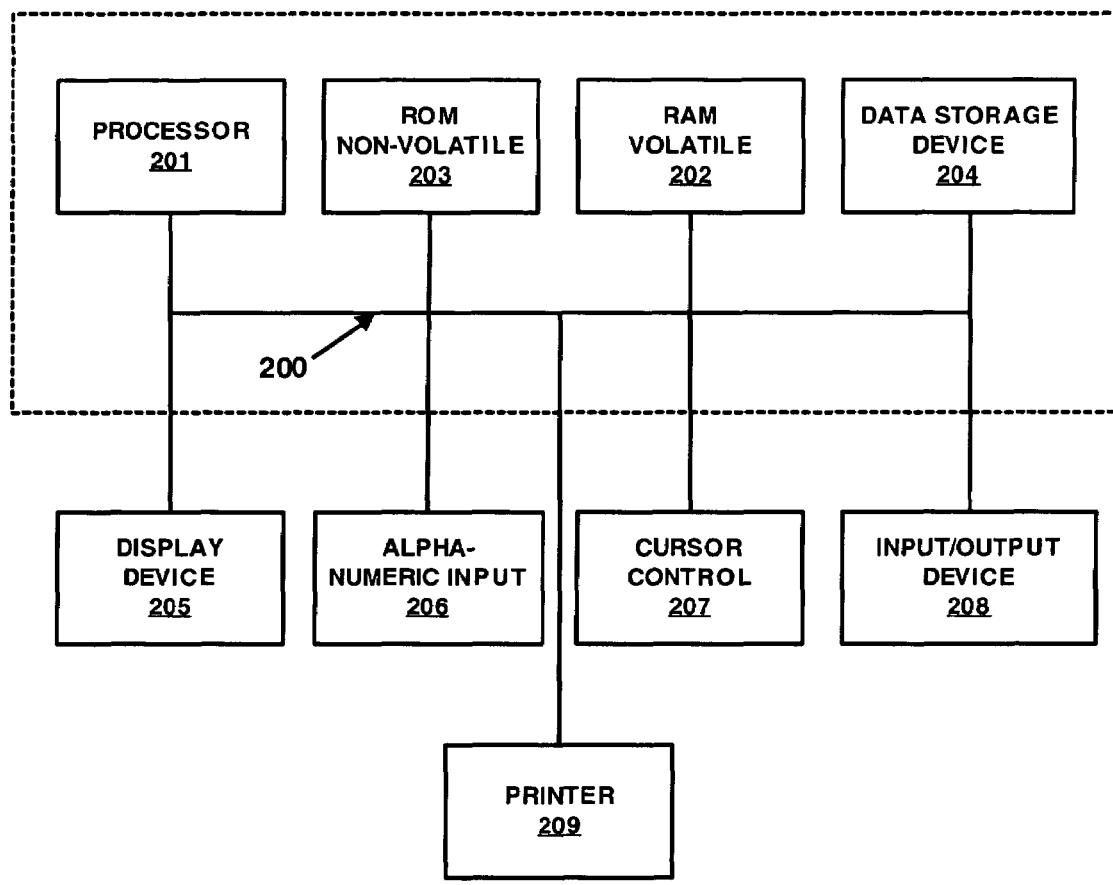
FIG. 2 is a block diagram of an exemplary computer system with which embodiments of the present invention may be implemented.

Referring first to FIG. 2, a block diagram of an exemplary computer system 212 is shown. It is appreciated that computer system 212 described herein illustrates an exemplary configuration of an operational platform upon which embodiments of the present invention can be implemented. Nevertheless, other computer systems with differing configurations can also be used in place of computer system 212 within the scope of the present invention. That is, computer system 212 can include elements other than those described in conjunction with FIG. 2.

Computer system 212 includes an address/data bus 200 for communicating information, a central processor 201 coupled with bus 200 for processing information and instructions; a volatile memory unit 202 (e.g., random access memory [RAM], static RAM, dynamic RAM, etc.) coupled with bus 200 for storing information and instructions for central processor 201; and a non-volatile memory unit 203 (e.g., read only memory [ROM], programmable ROM, flash memory, etc.) coupled with bus 200 for storing static information and instructions for processor 201. Computer system 212 may also contain an optional display device 205 (e.g. a monitor or projector) coupled to bus 200 for displaying information to the computer user. Moreover, computer system 212 also includes a data storage device 204 (e.g., disk drive) for storing information and instructions.

Also included in computer system 212 is an optional alphanumeric input device 206. Device 206 can communicate information and command selections to central processor 201. Computer system 212 also includes an optional cursor control or directing device 207 coupled to bus 200 for communicating user input information and command selections to central processor 201. Computer system 212 also includes signal communication interface (input/output device) 208, which is also coupled to bus 200, and can be a serial port. Communication interface 208 may also include wireless communication mechanisms. Using communication interface 208, computer system 212 can be communicatively coupled to other computer systems over a communication network such as the Internet or an intranet (e.g., a local area network). Computer system 212 also includes an optional printer 209 coupled to bus 200 for outputting electronic information representing text and images onto printed media.

Figure 3:
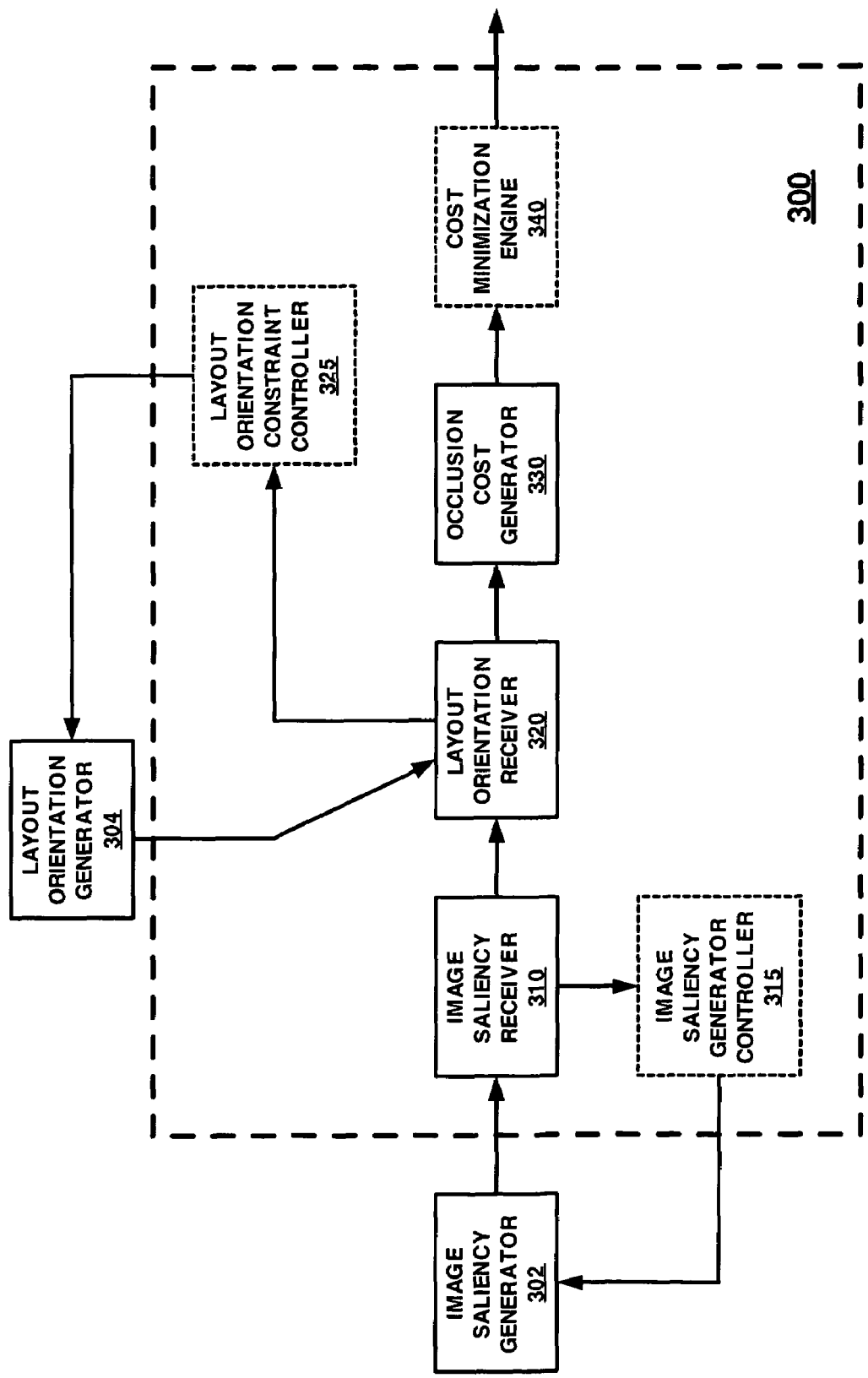
FIG. 3 is a block diagram of a system for determining image occlusion cost according to one embodiment of the present invention.

System for Determining Occlusion Cost for Concurrently Presenting One or More Images in a Shared Viewing Region With reference now to FIG. 3, a block diagram is shown of an occlusion costing system 300 for determining image occlusion costs. The following discussion will begin with a description of the structure of the present invention. This discussion will then be followed with a description of the operation of the present invention. With respect to the structure of the present invention, occlusion costing system 300 of the present embodiment determines an occlusion cost for presenting one or more images within a shared viewing region. The viewing region can be a region such as an electronic display, a projected display, or a printed media. It is appreciated that system 300 illustrates an exemplary embodiment. Other configurations within the scope of the present invention are possible.

Structure of the Present Occlusion Costing System

The occlusion costing system 300 contains an image saliency receiver 310. Image saliency receive 310 is for receiving image saliency data for an image to be displayed within a viewing region. Image saliency receiver 310 also receives image saliency data for multiple images to be concurrently displayed within a shared viewing region.

Image saliency receiver 310 is coupled to an external image saliency generator 302. Image salience receiver 3 10 receives image saliency data from image saliency generator 302. In one embodiment of the present invention, image saliency receiver 310 is coupled to an optional image saliency generator controller 315. If included, image saliency generator controller 315 is coupled to the external image saliency generator 302. Image saliency generator controller 315 allows automated and user manipulated control of parameters in the processing of images in image saliency generator 302.

As shown in FIG. 3, in accordance with one embodiment of the present invention, image saliency receiver 310 is coupled to a layout orientation receiver 320. In other embodiments image saliency generator 302 is coupled directly to the occlusion cost generator 330. In other embodiments of the present invention, image saliency generator 302 is coupled directly to an optional cost minimization engine 340. In FIG. 3, image saliency receiver 310 passes image saliency information to layout orientation receiver 320, which then passes the image saliency information onward to occlusion cost generator 330. In all embodiments, the image saliency data is eventually passed to occlusion cost generator 330.

As shown in FIG. 3, in accordance with one embodiment of the present invention, layout orientation receiver 320 is coupled to occlusion cost generator 330. Layout orientation receiver 320 is for receiving layout orientation data for presenting a single image within a viewing region. Layout orientation receiver 320 is also capable of receiving layout orientation information for presenting multiple images concurrently within a shared viewing region. In other embodiments of the present invention, layout orientation receiver 320 is coupled to optional cost minimization engine 340. In the embodiment of FIG. 3, layout orientation receiver 320 is also coupled to an external layout orientation generator 304 for receiving layout orientation information. Layout orientation generator 304 generates this layout orientation data, which describes one or more layouts of an image or images presented or displayed individually or concurrently within a viewing region.

In one embodiment of the present invention, layout orientation receiver 320 is coupled to an optional layout orientation constraint controller 325. If included, layout orientation constraint controller 325 is coupled to the external layout orientation generator 304. Layout orientation constraint controller 325 allows automated and user manipulated control of constraints on the generation of layouts in layout orientation generator 304.

In the embodiment of the present invention illustrated in FIG. 3, layout orientation receiver 320 is coupled to occlusion cost generator 330. Occlusion cost generator 330 receives image saliency data for each of one or more images being processed for layout. Occlusion cost generator 330 also receives layout orientation information in the form of one or more layout orientations for each of the one or more images being processed for display within a viewing region. As illustrated, all of this information is received via the coupling to layout orientation receiver 320. Occlusion cost generator 330 utilizes the image saliency data received to calculate an occlusion cost for each layout orientation received.

In some embodiments of the present invention, occlusion cost generator 330 communicates with layout orientation receiver 320 and image saliency receiver 310. In some embodiments this communication is for passing parameters to image saliency generator controller 315 and constraints to layout orientation constraint controller 325. In other embodiments, occlusion cost generator 330 is coupled directly to image saliency receiver 310 as previously described. Also, in other embodiments, occlusion cost generator 330 is coupled directly to layout orientation generator 304 for receiving layout orientation information, and to image saliency generator 302 for receiving image saliency information. In such an embodiment, the functions of layout orientation receiver 320 and image saliency receiver 310 are included within occlusion cost generator 330.

In some embodiments of the present invention, the occlusion costs that are output from occlusion cost generator 330 are used as an input to an optional cost minimization engine 340. In the illustrated embodiment of FIG. 3, occlusion cost generator 330 is coupled to cost minimization engine 340. In some embodiments, cost minimization engine 340 receives output data in the form of occlusion cost data from occlusion cost generator 330. In other embodiments, cost minimization engine 340 also communicates with occlusion cost generator 330 to select which layout orientations to generate occlusion costs for, or to control parameters in layout orientation constraint controller 325 or image saliency generator controller 315.

The purpose of cost minimization engine 340 is to choose a lowest occlusion cost layout. Cost minimization engine 340 chooses the lowest cost layout from the one or more layout orientations for an image, or plurality of images, for which occlusion cost generator 330 calculates an occlusion cost.

Operation of the Present Occlusion Costing System

The following discussion sets forth in detail the operation of the present invention. Techniques for recognizing objects and determining salient (or interesting) portions of images are known, and described in works such as, *A Model of Saliency-Based Visual Attention for Rapid Scene Analysis*, Laurent Itti, Christof Koch, and Ernst Niebur, IEEE Transactions on Pattern Analysis and Machine Intelligence, November 1998; and *Robust Real-Time Object Detection*, Paul Viola and Michael Jones, Second International Workshop on Statistical and Computational Theories of Vision—Modeling, Learning, Computing, and Sampling, Jul.13, 3001.

As shown in the block diagram of FIG. 3, image saliency generator 302 generates image saliency data, which identifies important or interesting sections in images. Image saliency data for an image comprises information such as saliency maps, facial recognition information, and other image analysis information. The image saliency generator 302 generates saliency data based on well-known and established image processing techniques, such as techniques for determining saliency and recognizing objects such as faces. In some embodiments, the image saliency information is also generated based on user-specified parameters or constraints received from an optional image saliency generator controller 315. The image saliency generator 302 then passes saliency data for each image to the image saliency receiver 310 in a form such as a ranking or mapping of salient areas of images. For instance, in some embodiments of the present invention the image saliency data can be represented as a grayscale image, where the value of each pixel is the saliency score for that pixel. In other embodiments of the present invention each image has saliency data passed in the form of a map, which may contain scores indicating the relative saliency of each section of the map. If more than one image is being processed for layout, saliency data for each of the multiple images is generated and passed to image saliency receiver 310 as described.

In one embodiment of the present invention, image saliency generator controller 315 allows the user to assign a priority, from a range of priorities, to facial ranking in saliency maps. In one embodiment of the present invention, image saliency generator controller 315 allows the user to assign greater weight, or saliency, to a region such as the center of an image or a region containing a family pet, regardless of the saliency result of the image processing techniques. In one embodiment of the present invention, image saliency generator controller 315 allows the user to designate portions of an image, such as a human face in profile, that must be preserved, but which might not otherwise be recognized as interesting via facial recognition or saliency analysis. In one embodiment of the present invention, image saliency generator controller 315 allows the user to designate people of higher and lesser importance in group photos, or else to mark people in the background of an image for low priority or elimination from saliency analysis. The previously listed examples are representative of image saliency generator 302 constraints that can be controlled by image saliency generator controller 315. In other embodiments of the present invention, a greater or fewer number of image saliency generation constraints can be controlled. If user-specified image saliency generation constraints are utilized, the saliency data for the image (or multiple images) is generated according the user-specified parameters, and then received in image saliency receiver 310.

In embodiments in accordance with the present invention, layout orientation generator 304 provides various image layouts for presenting the plurality of images in a shared region. As shown in FIG. 3, layout orientation generator 304 provides the image layouts to layout orientation receiver 320 of occlusion costing system 300. Layout orientations received by layout orientation receiver 320 contain information such as the size of the viewing region, the size of the image or images, the location of the images within the viewing region, and the relative priority of overlapped images (which image is on top). The layout orientation receiver 320 can also receive layout orientations in which one or more images have their respective image areas varied, or in which the viewing region area is varied. The layout orientation generator 304 generates image layouts utilizing well-known and established techniques for scaling, arranging, and/or overlapping an image or images within a viewing region. The layout orientation information is generated based on these techniques, pre-defined layout constraints, and in some embodiments user-specified constraints supplied by an optional layout orientation constraint controller 325. The layout orientation generator 304 then passes layout orientation data to layout orientation receiver 320. If a single image is being processed for layout in a viewing region, layout information for that single image is passed from layout orientation generator 304 to layout orientation receiver 320. If a set of two or more images is being processed for concurrent layout in a shared viewing region, layout information for the plurality of images is passed to layout orientation receiver 320. Based on the techniques and constraints, there can be one layout or a plurality of layouts generated for each image or set of images. Each of the one or more layouts generated is passed to layout orientation receiver 320, which then forwards the layout orientation information on to occlusion cost generator 330.

The purpose of occlusion cost generator 330 is to determine a quantitative occlusion cost associated with the relative position(s) of, and any potential overlapping between, the one or more images to be displayed in a viewing region. One example of a method used to derive an occlusion cost for an image is shown by the cost equation shown in Table 1.

TABLE 1

Example Equation for Calculation Occlusion Cost of a Layout

Cost = $\Sigma_{all\ images}$ (Total Saliency Occluded/Total Image Saliency)

The equation in Table 1 calculates the level of saliency for occluded regions in an image and divides it by the total sum of the saliency in the entire image. The result is an occlusion cost for having a region of an image covered or occluded in a layout orientation. The equation in Table 1 can be used to determine the occlusion cost for a layout orientation of a single image to be displayed alone in a viewing region. It can also be used to calculate, via summation, the occlusion cost for a layout of multiple images being displayed concurrently in a viewing region. The cost value is generated in a range from zero to one and can be thought of as a percentage. A cost closer to one equals nearly total occlusion, while a cost closer to zero indicates very little occlusion.

If occlusion cost generator 330 is processing a layout containing one image for display in a viewing region, occlusion cost generator 330 utilizes saliency data for the image to determine the occlusion cost of the layout of that image. If there is more than one layout of the image, the occlusion cost is determined for each layout of the image that has been generated and received from layout orientation generator 304. If more than one image is being processed for concurrent display in a shared viewing region, occlusion cost generator 330 utilizes saliency data for each of the multiple images to determine the occlusion cost of the layout for concurrently presenting the multiple images within the shared viewing region. If there is more than one layout for concurrently presenting the multiple images within the shared viewing region, the occlusion cost is determined for each layout of the multiple images that has been generated and received from layout orientation generator 304.

Additional user-specified values can be added directly into occlusion cost generator 330 as non-linearities to be incorporated in the occlusion cost determination, or can be added directly to the saliency data generated by image saliency generator 302 via the use of image saliency generator controller 315. For instance, if it is important that a certain face (or a specific image region) not be occluded, the face can be marked with high saliency in the image saliency data/map by setting a user-defined parameter via image saliency generator controller 315. This ensures that in most cases if a face is occluded, a high occlusion cost (of one or close to one) will result from the occlusion cost determination generated by occlusion cost generator 330.

Additional variables may also be included in the occlusion cost function shown in Table 1, so that a term relating to the scale of each image is added to the function. Thus if an image is enlarged in scale, the cost related to its scale will be decreased, since the increase in scale will result in an increase in the instances of the image either being occluded or causing occlusion of another image. Table 2 shows a sample of an occlusion cost function with scaling information added.

In the example occlusion cost function shown in Table 2, "n" and "m" can be set as constrained values. Large or small values of "n" and "m" will result in more or less aggressive scaling of the images. The values of "n" and "m" can also be input as user-specified parameters into layout orientation constraint controller 325 and image saliency generator controller 315, resulting in layout orientation generation and image saliency generation being adjusted in accordance with the scale of an image or images.

TABLE 2

Example Equation Including Image Scale in Occlusion Cost Calculation $$\text{Cost} = \frac{\left[\sum_{\text{all images}} (\text{Total Saliency Occluded/Total Image Saliency})\right]}{[(\text{Scale of image1})^n * (\text{Scale of image 2})^m]}$$

In some embodiments of the present invention, the operation of occlusion cost generator 330 can be further refined to better calculate occlusion costs based on area compensation of occlusions of an image in a layout. For instance after receiving the saliency data and receiving layout orientation data for the display of an image (or concurrent display of multiple images) in a viewing region, the data pertaining to the saliency and specific layout can be used to optimally determine the occlusion cost of a particular image in the layout. The occlusion cost generator 330 identifies the position of each image and how each image overlaps with another image or with the edge of the viewing region. The occlusion cost is then calculated based on three co-dependent components: the total saliency density of the viewing region, the fractional saliency visible, and the scaling of an image based on its total information content.

A specific instantiation of an area compensated occlusion costing calculation is shown in Table 3. The un-simplified version of the equation in Table 3 (to the left of the equal sign) contains three components which respectively relate to the three co-dependent components: the total saliency density of the viewing region, the fractional saliency visible, and the scaling of an image based on its total information content.

TABLE 3

Example Equation for Area Compensated Occlusion Cost of an Image $$C_i = \left(\frac{\sqrt{A_f}}{S_{v,i}}\right) * \left(\frac{S_{T,i}}{S_{v,i}}\right) * \left(\frac{S_{T,i}}{\sqrt{A_i}}\right) = \sqrt{\frac{A_f}{A_i}} * \frac{S_{T,i}^2}{S_{v,i}^2}$$

Where:
$C_i$ is the cost associated with image i.
$S_{v,i}$ is the fraction of saliency of image i which is visible
$S_{T,i}$ is the total saliency of image i
$A_i$ is the area of image i
$A_f$ is the area of the frame (window)

The total saliency density in the viewing region portion of the calculation attempts to maximize the amount of visible saliency captured within the viewing region. The fractional saliency visible portion of the calculation seeks to minimize the amount of saliency that is occluded in the layout, either by overlapping one image atop another, or by cropping part of an image with the edge of the viewing region. The portion of the calculation devoted to scaling an image based on its content seeks to create an even distribution of saliency across the viewing region by weighting the image cost toward increasing the scale of an image with high information content (e.g. landscape, rooftops, trees, etc.) and decreasing the scale of an image with lower information content (e.g. a single face).

If layout data received in occlusion cost generator 330 indicates an area compensated occlusion cost is being calculated for a layout comprising more than one image to be concurrently displayed within a shared viewing region, then occlusion cost generator 330 calculates the area compensated occlusion cost for each image in the layout and then calculates the area compensated occlusion cost for the entire layout. By calculating the geometric mean of the costs of each independent image, the area compensated occlusion cost for the entire layout can be generated. An example of an area compensated occlusion costing function for a layout with multiple images concurrently displayed in a shared viewing region is shown in Table 4.

TABLE 4

Example Equation for Area Compensated Occlusion Cost of a Layout $$C(L) = \sqrt[n]{\prod_{i=1}^{n} C_i}$$

Where:
C(L) is the area compensated occlusion cost an entire layout of images being concurrently displayed in a shared viewing region
n is the number of layouts, where n >= 1
$C_i$ is the area compensated occlusion cost associated with image I (see equation in Table 3)

Occlusion cost generator 330 also calculates occlusion costs for video images. Instead of a single cost function for each arrangement of objects, the cost function varies with time as the video plays and different portions of the video image become more or less salient. Put another way, the images do not have to be static. They can instead move with respect to the viewing region and with respect to one another (if there is more than one moving image). The resulting occlusion cost that is generated will not be static in time, but vary as the positions of the image (or images) change with respect to the viewing region, or if applicable with respect to another image.

The occlusion costs generated by occlusion cost generator 330 can be output in a variety of forms such as a list, a rank ordering, or a data stream. In one embodiment of the present invention, a user defines the maximum acceptable occlusion cost as an input to cost minimization engine 340. In one embodiment of the present invention, cost minimization engine 340 passively receives occlusion cost data for various layouts of an image or multiple images within a viewing region. Cost minimization engine 340 then chooses the lowest occlusion cost layout from among the received layouts. This lowest cost layout is then output from cost minimization engine 340 for display, printing, or further processing. If all evaluated occlusion costs are unacceptably high, cost minimization engine 340 indicates this as an output.

In some embodiments, cost minimization engine 340 uses well known mathematical modeling and projection techniques, such as steepest decent, to reduce calculations by homing in on the layout orientation that will have the lowest occlusion cost. In such an embodiment, cost minimization engine 340 communicates with occlusion cost generator 330 to steer it toward calculating occlusion costs for certain image layout orientations, thus saving time and reducing calculations. In some embodiments, the communication with occlusion cost generator 330 also encompasses communication through occlusion cost generator 330 to layout orientation receiver 320 and layout orientation constraint controller 325. This communication allows layout orientation generator 304 to be actively steered towards generating the layout orientation with the lowest occlusion cost. Such active steering reduces calculations and speeds layout orientation generation and occlusion cost generation by lowering the number of images generated and evaluated.

Methods for Determining Occlusion Costs for Concurrently Presenting Multiple Images in a Shared Viewing Region Referring now to FIG. 4, flow chart 400 of FIG. 4 will be described in conjunction with FIGS. 5-12 to describe in detail operation of embodiments in accordance with the present invention. FIGS. 5-12 illustrate several examples of image layout orientations that can be generated with image occlusion costing system 300 shown and described in conjunction with FIG. 3. Where appropriate reference is made to portions of FIG. 3 to more fully describe the illustrations in FIGS. 5-12.

Figure 4:
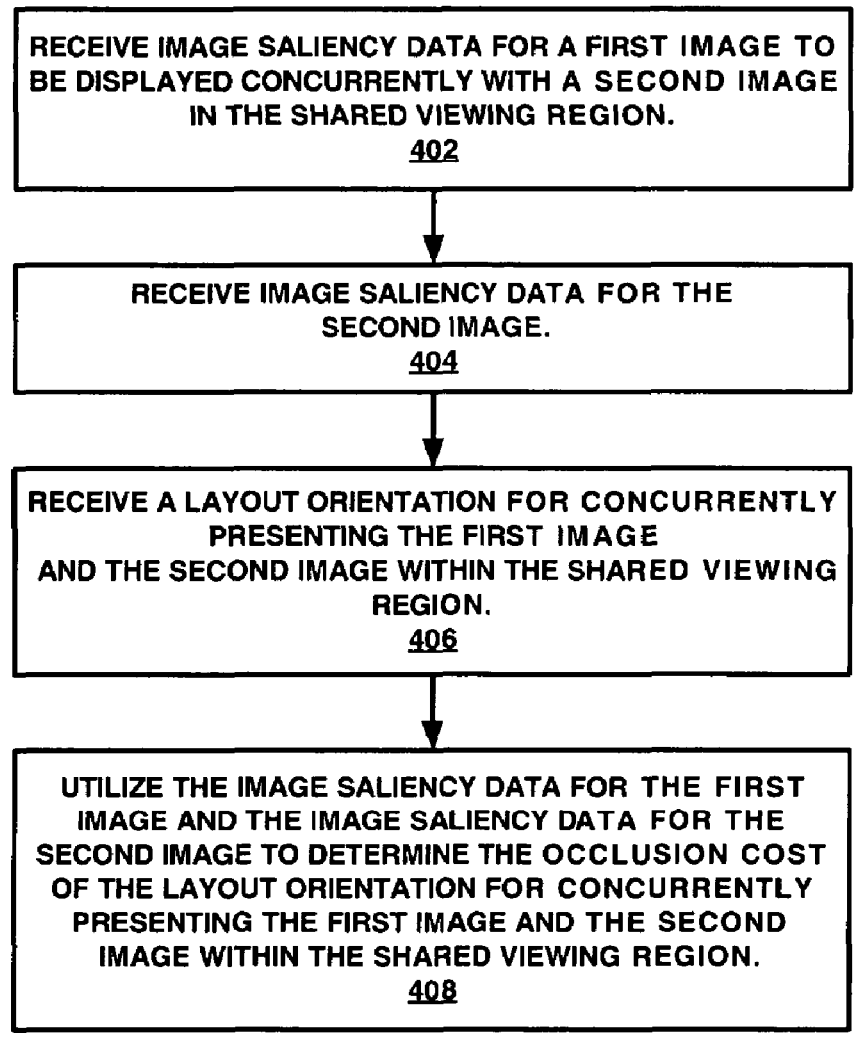
FIG. 4 is a flowchart of a method for determining an occlusion cost for concurrently presenting multiple images within a shared viewing region according to one embodiment of the present invention.

FIG. 4 is a flowchart 400 of a method for determining an occlusion cost for concurrently presenting multiple images within a shared viewing region according to one embodiment of the present invention. The shared viewing region can be an electronic display, a projected display, or a print display. The images can be still images or, in some embodiments moving images (e.g. video). Although specific steps are disclosed in flowchart 400, such steps are exemplary. That is, embodiments of the present invention are well suited to performing various other (additional) steps or variations of the steps recited in flowchart 400. It is appreciated that the steps in flowchart 400 may be performed in an order different than presented, and that not all of the steps in flowchart 400 may be performed. In one embodiment, flowchart 400 is implemented as computer-readable program code stored in a memory unit of computer system 212 and executed by processor 201 (FIG. 2).

In 402 of FIG. 4, in one embodiment of the present invention, image saliency data is received for a first image to be displayed concurrently with a second image in the shared viewing region. Image saliency data for the first image can be received in image saliency receiver 310 in the form of a map, a graph, a gray-scale representation, digital data, or any format known and used by those skilled in the art of electronic image manipulation. The received image saliency data is generated in image saliency generator 302 according to well-known techniques of saliency mapping, face recognition, object recognition and the like, and in some embodiments of the present invention it is also generated in image saliency generator 302 according to user-specified parameters received from image saliency generator controller 315.

Figure 5:
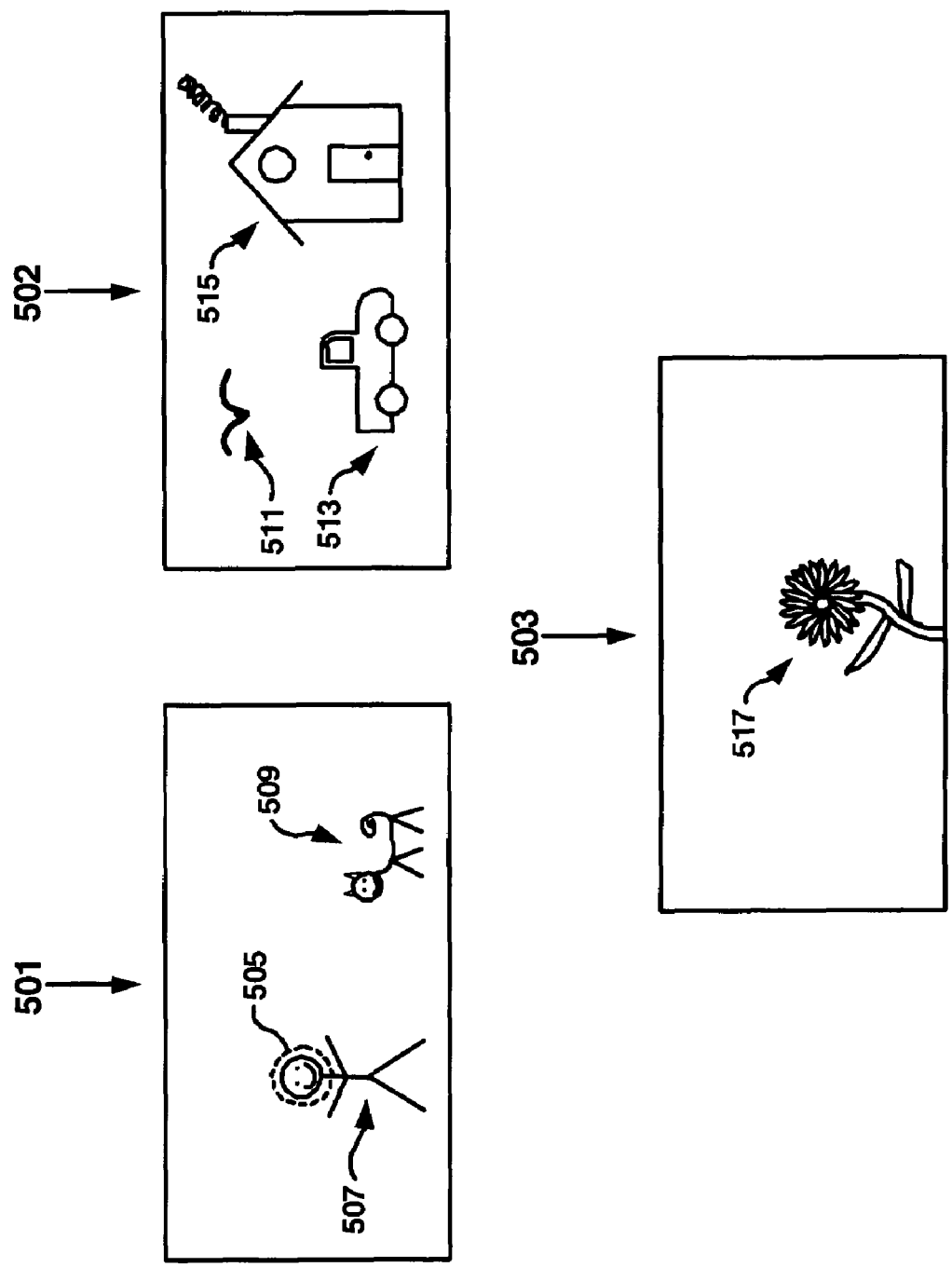
FIG. 5 is a set of three exemplary images to be displayed according to selected embodiments of the present invention.

An example of a saliency map for a first image can be gleaned from FIG. 5. FIG. 5 shows a set of three exemplary images 501, 502, 503 to be displayed according to selected embodiments of the present invention. Image 501 contains a person 507 and a cat 509. In one embodiment, a saliency map of saliency data for image 501 would indicate that the person 507 has a high salience. Additionally, in such an embodiment, the saliency map would indicate the cat 509 as having a medium salience. Also in such an embodiment the saliency map generator would indicate the facial region 505 of person 507 as having very high salience on the saliency map. In the present embodiment, the saliency map indicates that the blank portions of image 501 have little or no salience. The saliency map for image 501 is received in image saliency receiver 310 and passed onward to occlusion cost generator 330.

In 404 of FIG. 4, in one embodiment of the present invention, image saliency data is received in image saliency receiver 310 for the second image. Image saliency data for the second image can be received in image saliency receiver 310 in the form of a map, a graph, a gray-scale representation, digital data, or any format known and used by those skilled in the art of electronic image manipulation. The received image saliency data is generated in image saliency generator 302 according to well-known techniques of saliency mapping, face recognition, object recognition and the like, and in some embodiments of the present invention it is also generated in image saliency generator 302 according to user-specified parameters received from image saliency generator controller 315. If there are more than two images, image saliency data is generated by image saliency generator 302 and received in image saliency receiver 310 for each additional image.

An example of a saliency map for a second image can be gleaned from FIG. 5. Image 502 contains a bird 511, a truck 513, and a house 515. In one embodiment, a saliency map of saliency data for image 502 would indicate that the house 515 has a high salience. Additionally, in such an embodiment, the saliency map would indicate the truck 513 as having a high salience. Also in such an embodiment the saliency map generator would indicate the bird 511 as having low salience on the saliency map, because the bird is small. In the present embodiment, the saliency map indicates that the blank areas of image 502 have little or no salience. The saliency map for image 502 is received in image saliency receiver 310 and passed onward to occlusion cost generator 330.

In 406 of FIG. 4, in one embodiment of the present invention, a layout orientation is received at layout orientation receiver 320 for concurrently presenting the first image and the second image within the shared viewing region. In some embodiments of the present invention, layout orientations received comprise a plurality of images greater than two images. In some embodiments of the present invention, a plurality of layouts is received at layout orientation receiver 320 for concurrently presenting the plurality of images within the shared viewing region. In some embodiments of the present invention, the layout or layouts received are generated according to user-specified constraints generated by layout orientation constraint controller 325. In some embodiments of the present invention, the layout data received at layout orientation receiver 320 can comprise receiving a layout orientation in which the first image has an image area which can be varied. In some embodiments of the present invention, the layout data received at layout orientation receiver 320 can comprise receiving a layout orientation in which the second image has an image area which can be varied. In some embodiments of the present invention, the layout data received at layout orientation receiver 320 comprises receiving a layout orientation in which the image viewing region has an area which can be varied. In some embodiments of the present invention, the layout orientation data received at layout orientation receiver 320 comprises receiving a layout orientation from layout orientation generator 304 in which a plurality of images can each have their respective image areas varied.

Figure 6:
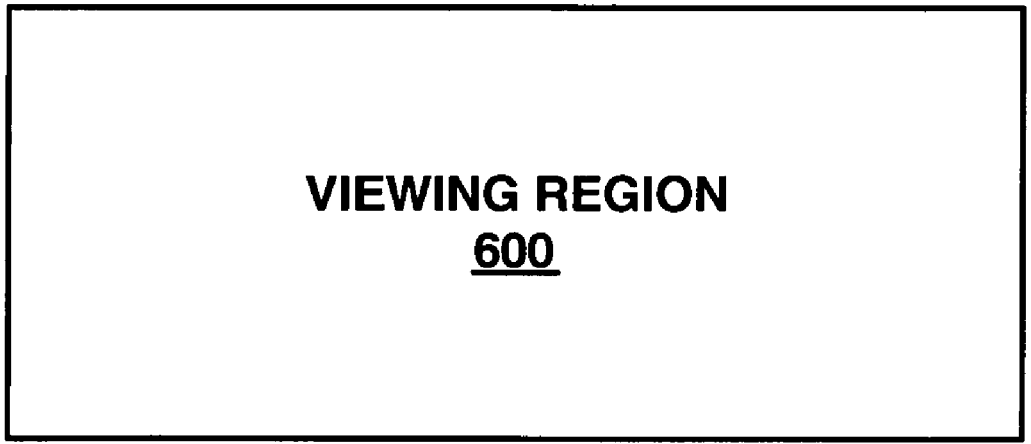
FIG. 6 is an exemplary viewing region for images according to one embodiment of the present invention.

Several examples of layout orientations in a shared viewing region are illustrated in conjunction with FIGS. 6-11. FIG. 6 is an exemplary viewing region 600 for images according to one embodiment of the present invention. The exemplary viewing region 600 of FIG. 6 is utilized in conjunction with the examples illustrated in FIGS. 7-11.

Figure 7:
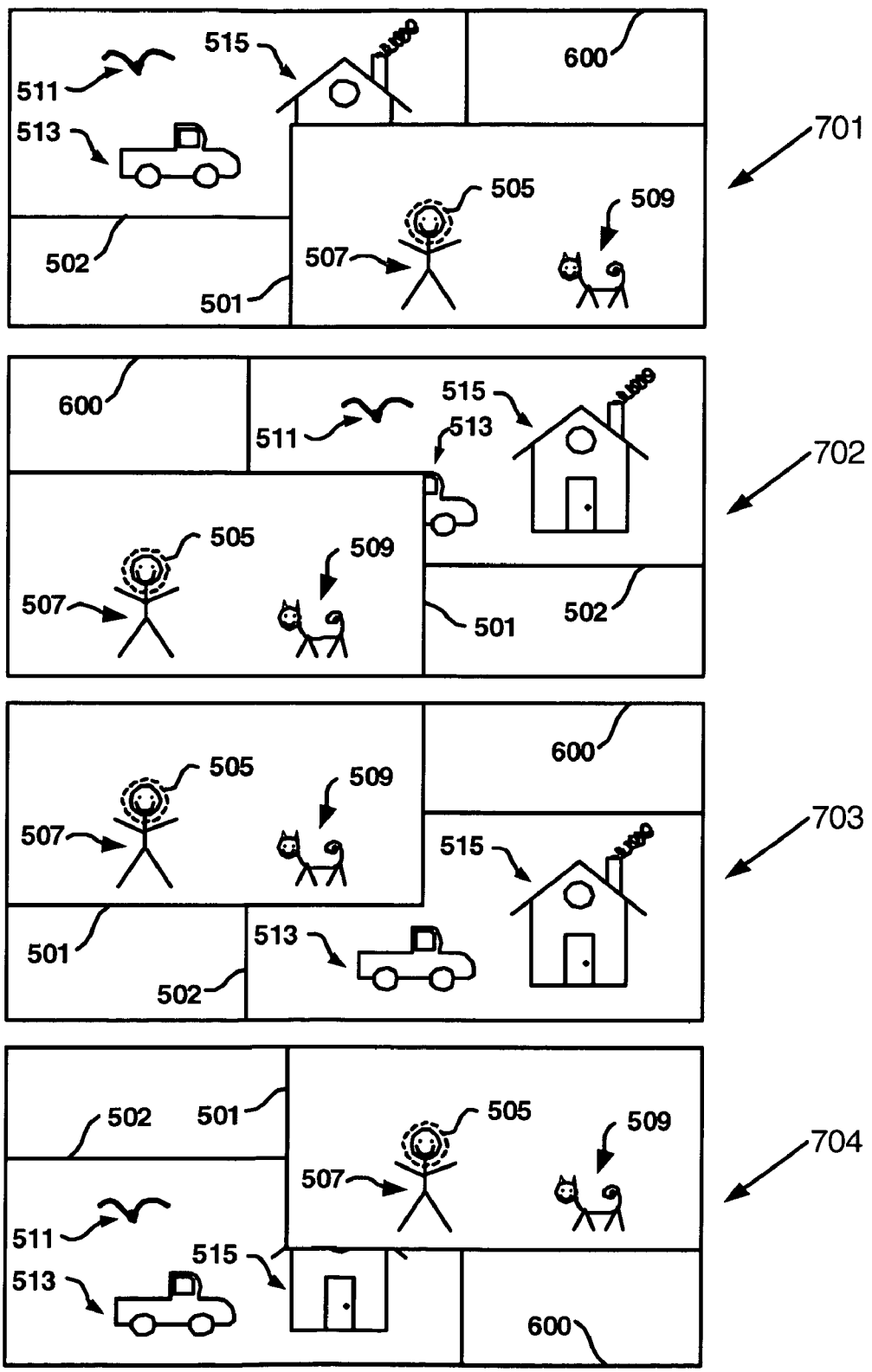
FIG. 7 is a set of four example layout orientations of images concurrently displayed in shared viewing regions according to one embodiment of the present invention.

FIG. 7 is a set of four example layout orientations (701, 702, 703, and 704) of images concurrently displayed in a shared viewing region according to one embodiment of the present invention. In one embodiment, FIG. 7 illustrates an example of the four possible layout orientations that are received by layout orientation receiver 320 and passed to occlusion cost generator 330, when layout orientation generator 304 is constrained via layout orientation constraint controller 325 to generate layouts of two images (501 and 502) to be positioned in opposite corners of the viewing region, with widths of the images constrained to a percentage of approximately 65% of the viewing region width, and one image 501 given priority to be displayed on top.

Figure 8:
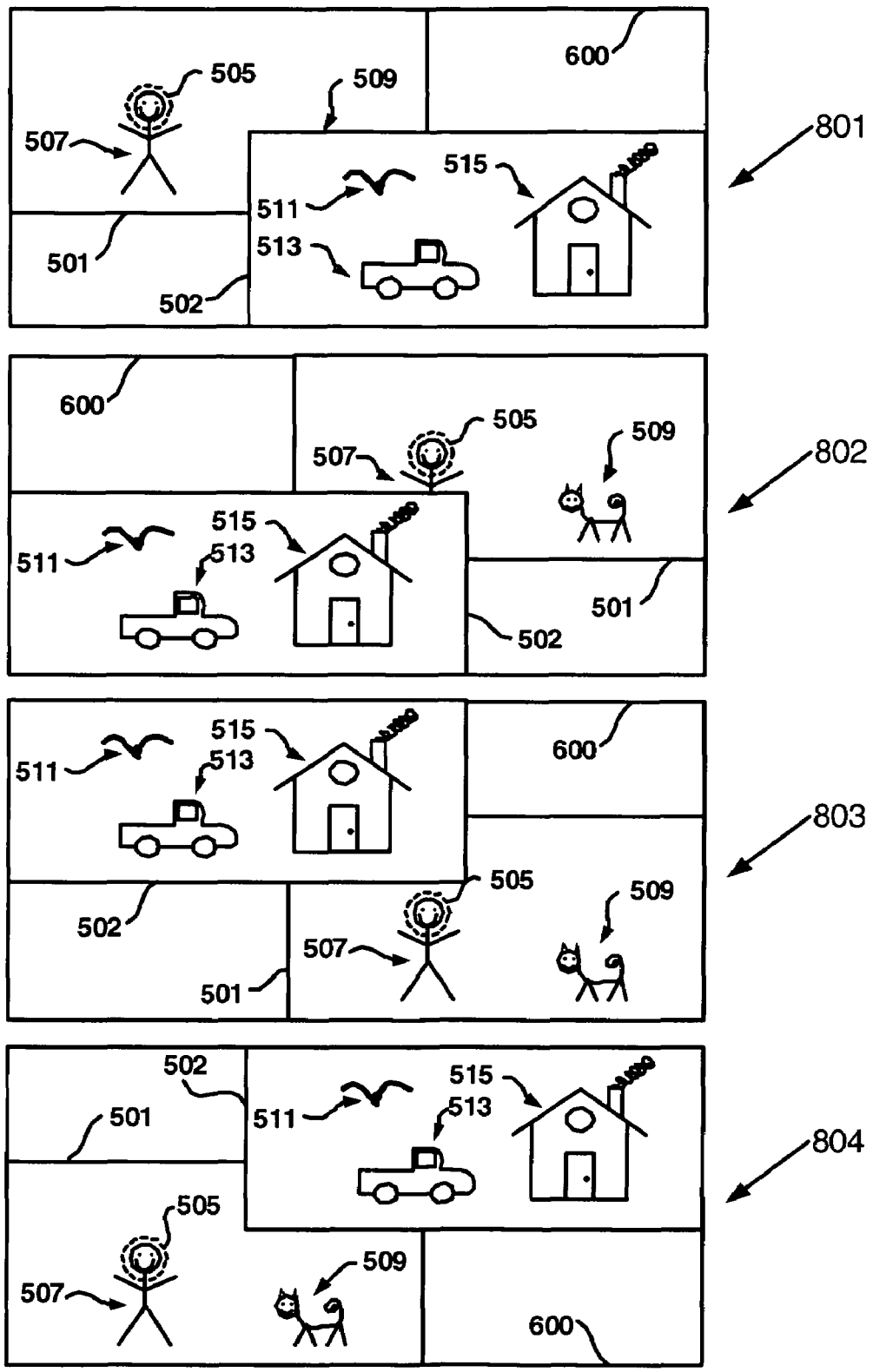
FIG. 8 is a set of four example layout orientations of images concurrently displayed in shared viewing regions according to one embodiment of the present invention.

FIG. 8 is a set of four example layout orientations (801, 802, 803, and 804) of images concurrently displayed in a shared viewing region according to one embodiment of the present invention. In one embodiment, FIG. 8 is a continuation of the example from FIG. 7. If the user-selected or automatic constraints in layout orientation constraint controller 325 are relaxed so that neither image 501 or 502 has priority to be displayed on top, then there are eight possible layouts. If more constraints are relaxed, even more possible layouts will be generated. FIG. 8 shows the other four possible layouts (801, 802, 803, and 804) that are received by layout orientation receiver 320 when the image priority constraint to layout orientation generator 304 is relaxed. These four layouts are then passed to occlusion cost generator 330 for occlusion costing utilizing the saliency maps for image 501 and image 502.

Figure 9:
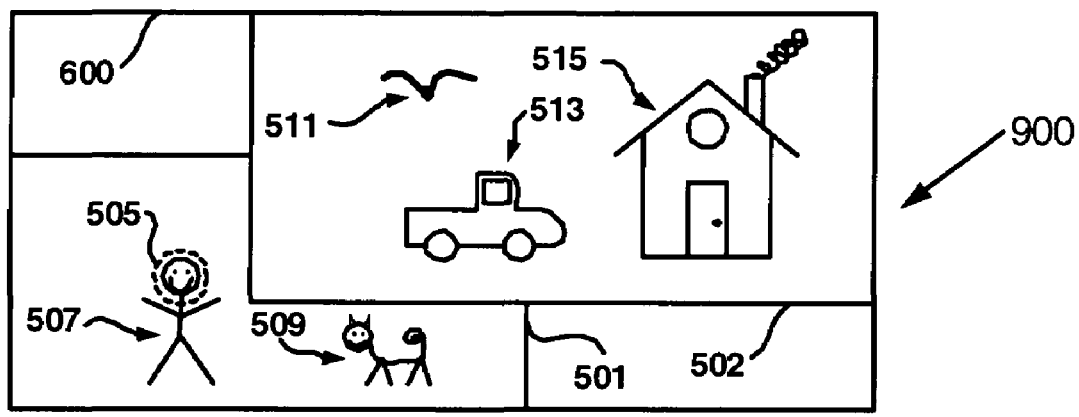
FIG. 9 is an example layout orientation of scaled images concurrently displayed in a shared viewing region according to one embodiment of the present invention.

FIG. 9 is an example layout orientation of scaled images (501 and 502) displayed in a shared viewing region 600 according to one embodiment of the present invention. FIG. 9 shows an example of one possible layout orientation 900 that is received by a layout orientation receiver 320 and passed to occlusion cost generator 330, if layout orientation generator 304 is constrained via layout orientation constraint controller 325 to generate layouts of two images (501 and 502) with one image 502 scaled upward until it touches two edges of the viewing region 600, and other image 501 then scaled downward to a percentage of the width of the first image, for instance approximately 65%, and then displayed overlapped by the larger image 502.

Figure 10:
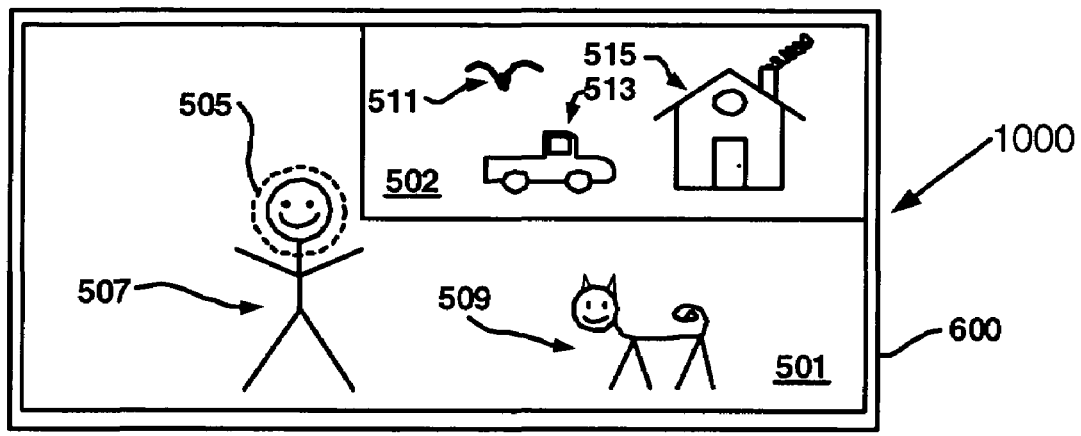
FIG. 10 is an example layout orientation of scaled images concurrently displayed in a shared viewing region according to one embodiment of the present invention.

FIG. 10 is an example layout orientation of scaled images concurrently displayed in a shared viewing region 600 according to one embodiment of the present invention. FIG. 10 shows an example of one possible layout orientation 1000 that is received by a layout orientation receiver 320 and passed to occlusion cost generator 330, if layout orientation generator 304 is constrained via layout orientation constraint controller 325 to generate layouts of two images (501 and 502) with one image 501 scaled upward until it substantially fills the viewing region 600, and other image 502 then scaled downward to a percentage of the width of the first image, for instance approximately 45%, and then displayed inset in the larger image 501.

Figure 11:
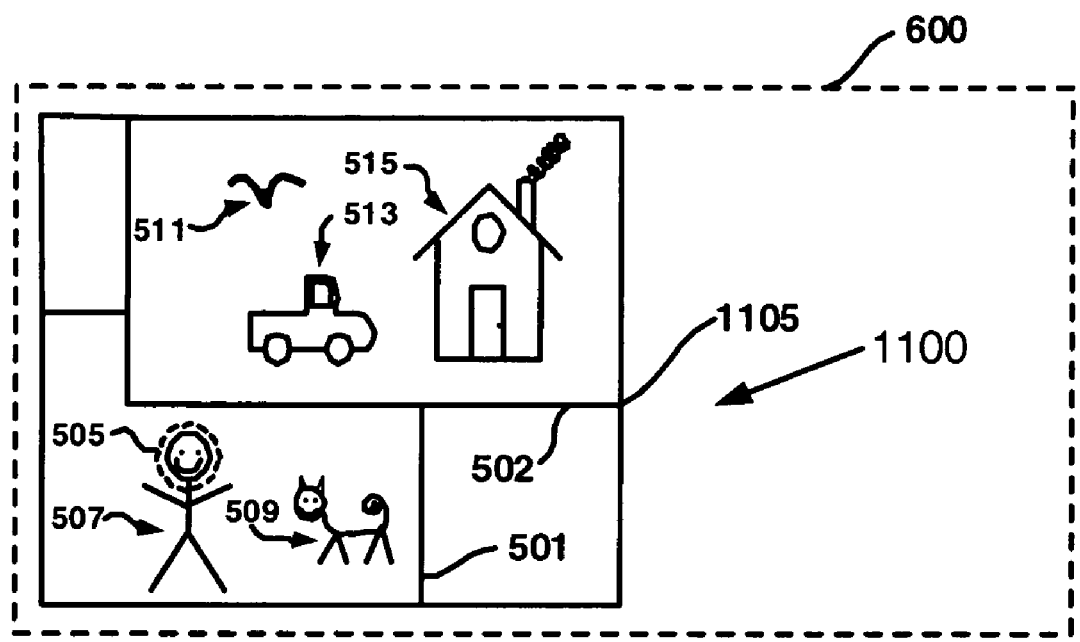
FIG. 11 is an example layout orientation of scaled images displayed in a scaled shared viewing region according to one embodiment of the present invention.

FIG. 11 is an example layout orientation 1100 of scaled images concurrently displayed in a scaled shared viewing region 1105 according to one embodiment of the present invention. FIG. 11 shows an example of one possible layout orientation 1100 that is received by a layout orientation receiver 320 and passed to occlusion cost generator 330, if layout orientation generator 304 is constrained via layout orientation constraint controller 325 to generate layouts of two images (501 and 502), scaled and cropped independently of one another and displayed in a reduced scaled common viewing region 1105. Viewing region 1105 has been overlaid on a dashed representation of viewing region 600 to show the difference in scale between viewing region 1105 and viewing region 600.

Likewise, in other embodiments of the present invention, a user can utilize layout orientation constraint controller 325 to control similar constraints on the arrangement and scaling of more than two images to be concurrently displayed in a shared viewing region. As an example, in a layout having three images, an automated constraint or a user-specified constraint can constrain the location of the images. For example, one image could be presented each bottom corner of a viewing region with the third image centered and aligned with the top of the viewing region. User-specified or automated constraints can also constrain the scale of the multiple images. For instance each image can be constrained to a percentage, such as 30%, of the width of the viewing region.

In 408 of FIG. 4, in one embodiment of the present invention, the image saliency data for the first image and the image saliency data for the second image is utilized by occlusion cost generator 330 to determine the occlusion cost of the layout orientation for concurrently presenting the first image and the second image within the shared viewing region. In some embodiments of the present invention, the image saliency data for the first image and the second image are used by occlusion cost generator 330 to determine the respective occlusion costs of a plurality of layout orientations for concurrently presenting the first image and second image in a shared viewing region. In some embodiments of the present invention image saliency data for a plurality of images (greater than two) is utilized by occlusion cost generator 330 to determine the occlusion costs of a layout or plurality of layouts for concurrently presenting the plurality of images within the shared viewing region. One embodiment of the present invention further comprises using the image saliency data for the images to generate occlusion costs for the layout orientations, and using cost minimization engine 340 to choose a lowest occlusion cost layout orientation from the respective occlusion costs that have been generated. Descriptions of the occlusion costs of the layout orientations in FIGS. 7-11 provide some examples of occlusion costing for various layouts, and of choosing a minimum cost from among several layouts.

Referring again to FIG. 7, layout orientation 701 shows images 501 and 502 concurrently displayed in a shared viewing region 600. In image 501, neither person 507, nor cat 509, nor facial region 505 is occluded. Image 501 overlaps image 502 and obscures part of house 515, which is a high saliency portion of image 502. In image 502, neither bird 511 nor truck 513 is occluded. Because of this, occlusion cost generator 330 generates a medium-high occlusion cost, for instance of 50%, for layout 701.

Layout orientation 702 shows images 501 and 502 concurrently displayed in a shared viewing region 600. In image 501, neither person 507, nor cat 509, nor facial region 505 is occluded. Image 501 overlaps image 502 and obscures part of truck 513, which is a high saliency portion of image 502. In image 502, neither bird 511 nor house 515 is occluded. Because of this, occlusion cost generator 330 generates a medium occlusion cost, for instance of 45%, for layout 702.

Layout orientation 703 shows images 501 and 502 concurrently displayed in a shared viewing region 600. In image 501, neither person 507, nor cat 509, nor facial region 505 is occluded. Image 501 overlaps image 502 and obscures bird 511 (not visible), which is a low saliency portion of image 502. In image 502, neither truck 513 nor house 515 is occluded. Because of this, occlusion cost generator 330 generates a low occlusion cost, for instance of 15%, for layout 703.

Layout orientation 704 shows images 501 and 502 concurrently displayed in a shared viewing region 600. In image 501, neither person 507, nor cat 509, nor facial region 505 is occluded. Image 501 overlaps image 502 and obscures part of house 515, which is a high saliency portion of image 502. In image 502, neither bird 511 nor truck 513 is occluded.

Because of this, occlusion cost generator 330 generates a medium occlusion cost, for instance of 40%, for layout 704.

In one embodiment of the present invention occlusion cost generator 330 passes the costs of the layouts (701-704) to optional cost minimization engine 340. Cost minimization engine 340 selects layout 703 as the best layout, since layout 703 has the lowest occlusion cost of the four layouts (701-704).

Referring again to FIG. 8, layout orientation 801 shows images 501 and 502 concurrently displayed in a shared viewing region 600. In image 502, neither bird 511, nor truck 513, nor house 515 is occluded. Image 502 overlaps image 501 and obscures most of cat 509, which is a medium saliency portion of image 501. In image 501, neither person 507 nor facial region 505 is occluded. Because of this, occlusion cost generator 330 would generate a medium occlusion cost, for instance of 30%, for layout 801.

Layout orientation 802 shows images 501 and 502 concurrently displayed in a shared viewing region 600. In image 502, neither bird 511, nor truck 513, nor house 515 is occluded. Image 502 overlaps image 501 and obscures part of person 507, which is a high saliency portion of image 501. In image 501, neither cat 509 nor facial region 505 is occluded. Because of this, occlusion cost generator 330 generates a high occlusion cost, for instance of 60%, for layout 802.

Layout orientation 803 shows images 501 and 502 concurrently displayed in a shared viewing region 600. In image 502, neither bird 511, nor truck 513, nor house 515 is occluded. Image 502 overlaps image 501 and obscures most of facial region 505, which is a very high saliency portion of image 501. In image 501, cat 509 is not occluded, and only facial region 505 of person 507 is occluded. Because facial region 505 has a very high saliency, occlusion cost generator 330 generates a very high occlusion cost, for instance of 90% or 100%, for layout 803.

Layout orientation 804 shows images 501 and 502 concurrently displayed in a shared viewing region 600. In image 502, neither bird 511, nor truck 513, nor house 515 is occluded. Image 502 overlaps image 501 and obscures only blank portions of image 501 which have little or no salience. In image 501, neither cat 509, nor facial region 505, nor person 507 is occluded. Because of this, occlusion cost generator 330 generates a very low occlusion cost, for instance of 2%, for layout 804.

In one embodiment of the present invention, occlusion cost generator 330 passes the costs of the layouts (801-804) to optional cost minimization engine 340 to be evaluated along with layouts 701-704. Cost minimization engine 340 selects layout 804 as the best layout, since layout 804 has the lowest occlusion cost of all eight layouts (701-704 and 801-804) evaluated.

Referring again to FIG. 9 and layout 900. Image 502 is enlarged, and overlaps a blank portion of the reduced size image 501. In image 501, neither person 507, nor cat 509, nor facial region 505 is occluded. In image 502, neither bird 511, nor truck 513, nor house 515 is occluded. Since no portions of salient interest are occluded in either image 501 or image 502, occlusion cost generator 330 calculates a low occlusion cost, for instance of 2%, for layout 900.

Referring again to FIG. 10 and layout 1000, image 501 is enlarged to fill nearly the entire viewing region 600. Image 502 is reduced in size, and inset within image 501, overlapping a blank portion of image 501. In image 501, neither person 507, nor cat 509, nor facial region 505 is occluded. In image 502, neither bird 511, nor truck 513, nor house 515 is occluded. Since no portions of salient interest are occluded in either image 501 or image 502, occlusion cost generator 330 calculates a low occlusion cost, for instance of 2%, for layout 1000.

Referring again to FIG. 11 and layout orientation 1100, image 502 is cropped and reduced in size, and overlaps a blank portion of the cropped, reduced size image 501. Both images (501 and 502) are concurrently displayed in scaled down viewing region 1105. In image 501, neither person 507, nor cat 509, nor facial region 505 is occluded. In image 502, neither bird 511, nor truck 513, nor house 515 is occluded. Since no portions of salient interest are occluded in either image 501 or image 502, occlusion cost generator 330 calculates a low occlusion cost, for instance of 2%, for layout 1100. Note also that in layout 1100, some blank portions of image 501 and image 502 have been cropped, which helps maximize the saliency displayed in viewing region 1105.

When evaluating multiple layouts where areas of images or viewing ranges are being scaled, there are various ways to find a low occlusion cost layout orientation, such as layout orientation 1100. Layout orientation 1100 can be reached by occlusion costing numerous iterations of layouts and selecting the lowest occlusion cost layout. Another way to reach a low occlusion cost layout, such as layout 100, more quickly and efficiently is by utilizing feedback from cost minimization engine 340 to actively steer occlusion cost generator 330 toward calculating occlusion costs for layouts that are projected to have low occlusion costs. In another embodiment, cost minimization engine 340 is allowed to actively steer layout orientation generator 304 toward layout 1100 with layout orientation constraint controller 325. Because cost minimization engine utilizes mathematical modeling and projection methods, such as steepest decent for instance, many layout orientations can be skipped past without generation or without occlusion costing, once a trend in occlusion costs has been identified.

Figure 12:
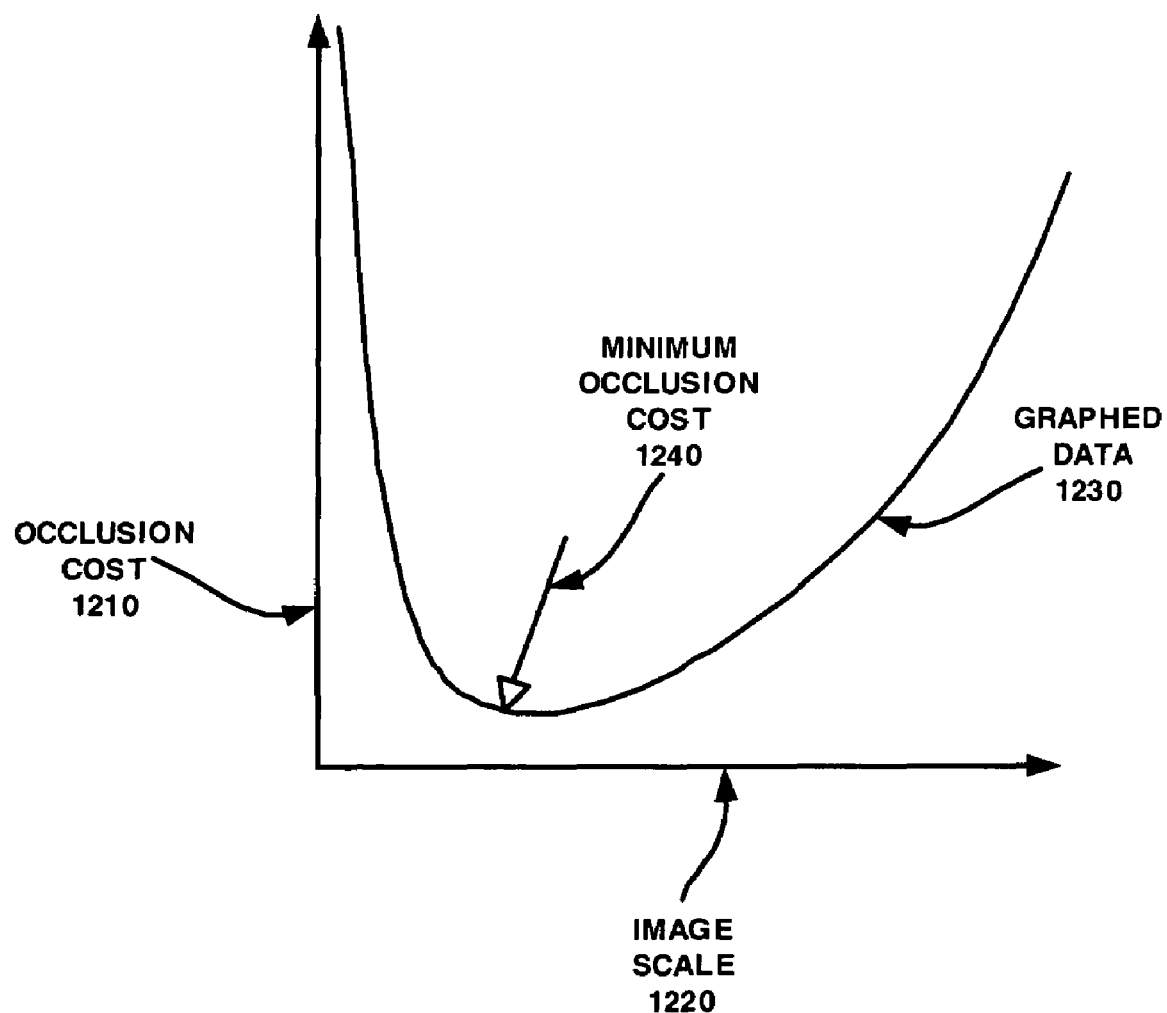
FIG. 12 is an exemplary graph of occlusion cost versus image scale according to one embodiment of the present invention.

FIG. 12 is an exemplary graph of occlusion cost 1210 versus image scale 1220 according to one embodiment of the present invention. The graphed data 1230 shows an example of how occlusion cost 1210 can vary with image scale 1220. Arrow 1240 is pointing at the region of the graphed data 1230 that represents the layout with the minimum occlusion cost. Cost minimization engine 340 tracks occlusion costs using known mathematical techniques, such as steepest decent, to project minimums and maximums, and to project a minimum occlusion cost from an evaluated subset of layout orientations. In layout orientations containing multiple images, the calculations and corresponding graphs of results are more complex but the techniques used are similar. Cost minimization engine 340 increases efficiency of system 300 by evaluating a subset of all layout orientations, projecting the region where the minimum occlusion cost is found (shown by arrow 1240), and then actively steering occlusion cost generator 330 toward selectively calculating occlusion costs only for layout orientations in the identified region (shown by arrow 1240). In other embodiments cost minimization engine 340 increases efficiency even more by actively steering layout orientation generator 304 via layout orientation constraint controller 325 to only generate layouts in the identified region with the minimum occlusion costs (shown by arrow 1240).

Figure 13:
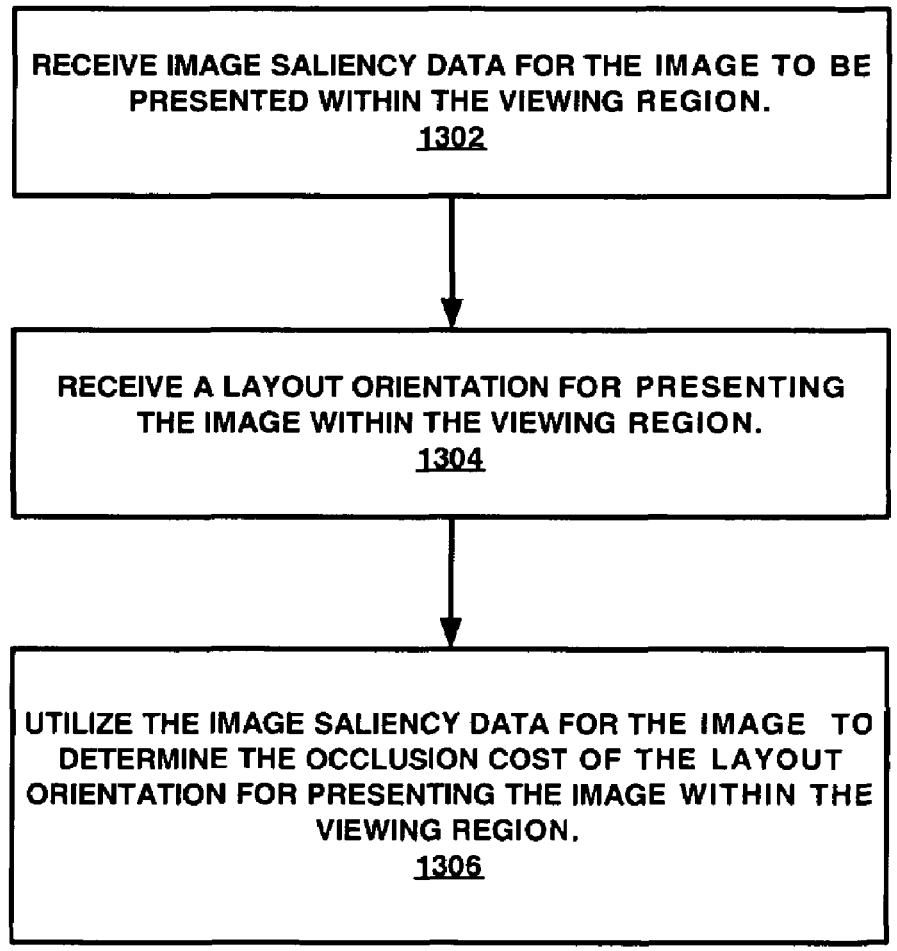
FIG. 13 is a flowchart of a method for determining an occlusion cost for presenting an image within a viewing region according to one embodiment of the present invention.
Figure 14:
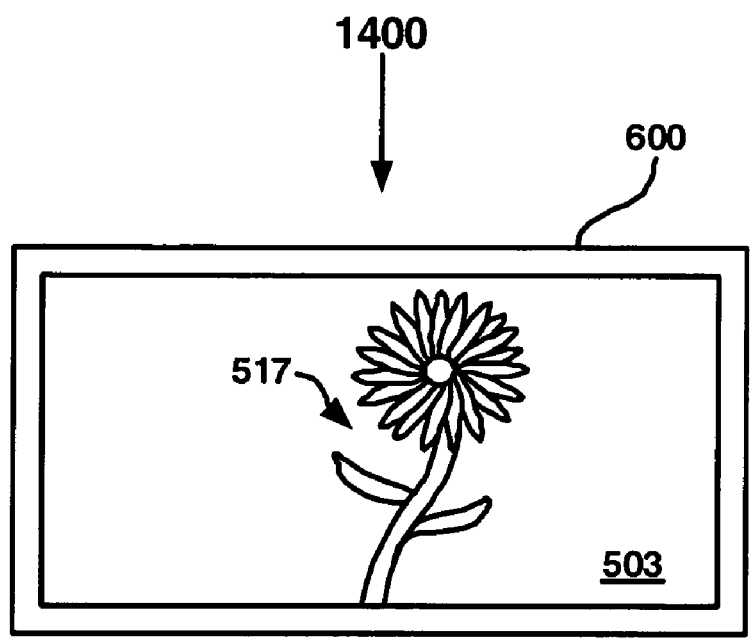
FIG. 14 is an example layout orientation of a single scaled image displayed in a viewing region according to one embodiment of the present invention.

Referring now to FIG. 13, flow chart 1300 will be described in conjunction with FIGS. 5 and FIG. 14 to describe in detail operation of embodiments in accordance with the present invention. FIGS. 5 and 14 describe an example of an image layout orientation that can be generated with image occlusion costing system 300 shown and described in conjunction with FIG. 3. Where appropriate reference is made to portions of FIG. 3 to more fully describe the examples in FIGS. 5 and 14.

FIG. 13 is a flowchart 1300 of a method for determining an occlusion cost for presenting an image within a viewing region according to one embodiment of the present invention. The viewing region can be an electronic display, a projected display, or a print display. The image can be a still image or, in some embodiments a moving image (e.g. video). Although specific steps are disclosed in flowchart 1300, such steps are exemplary. That is, embodiments of the present invention are well suited to performing various other (additional) steps or variations of the steps recited in flowchart 1300. It is appreciated that the steps in flowchart 1300 may be performed in an order different than presented, and that not all of the steps in flowchart 1300 may be performed. In one embodiment, flowchart 1300 is implemented as computer-readable program code stored in a memory unit of computer system 212 and executed by processor 201 (FIG. 2).

In 1302 of FIG. 13, in one embodiment of the present invention, image saliency data is received for the image to be presented within the viewing region. Image saliency data for the image can be received in image saliency receiver 310 in the form of a map, a graph, a gray-scale representation, digital data, or any format known and used by those skilled in the art of electronic image manipulation. The received image saliency data is generated by image saliency generator 302 according to well-known techniques of saliency mapping, face recognition, object recognition and the like, and in some embodiments of the present invention it is also generated by image saliency generator 302 according to user-specified parameters from image saliency generator controller 315.

Referring to FIG. 5 and image 503, a flower 517 is shown. A saliency map of saliency data for image 503 shows the region that contains flower 517 to have high salience. Because the rest of image 503 is blank, the blank portions are assigned little or no salience in a saliency map. A saliency map of image 503 is received by image saliency receiver 310 and forwarded to occlusion cost generator 330.

In 1304 of FIG. 13, in one embodiment of the present invention, a layout orientation is received at layout orientation receiver 320 from layout orientation generator 304 for presenting the image within the viewing region. In one embodiment of the present invention, pluralities of layouts are received at layout orientation receiver 320 for presenting the image within the viewing region. In one embodiment of the present invention, the layout or layouts received in layout orientation receiver 320 are generated by layout orientation generator 304 according to user-specified constraints provided by layout orientation constraint controller 325. In one embodiment of the present invention, the layout data received in layout orientation receiver 320 comprises receiving a layout orientation in which the image has an image area which can be varied. In some embodiments of the present invention, the layout data received in layout orientation receiver 320 comprises receiving a layout orientation in which the image viewing region has an area which can be varied.

FIG. 14 is an example layout orientation 1400 of a single scaled image displayed in a viewing region according to one embodiment of the present invention. FIG. 14 shows an example of one possible layout orientation 1400 that is received by a layout orientation receiver 320 and passed to occlusion cost generator 330, if layout orientation generator 304 is constrained via layout orientation constraint controller 325 to generate layouts of image 503 that are scaled upward to maximize the display of the most salient regions of image 503 within the viewing region 600.

In 1306 of FIG. 13, in one embodiment of the present invention, the image saliency data for the image is utilized by occlusion cost generator 330 to determine the occlusion cost of the layout orientation for presenting the image within the viewing region. In one embodiment of the present invention, the image saliency data for the image is used by occlusion cost generator 330 to determine the respective occlusion costs of a plurality of layout orientations for presenting the first image in a viewing region. One embodiment of the present invention further comprises using the image saliency data for the image to generate occlusion costs for a plurality of layout orientations with occlusion cost generator 330, and then using cost minimization engine 340 to choose the layout orientation with the lowest occlusion cost from the respective occlusion costs that have been generated.

Referring again to FIG. 14, the optimum scaled layout of image 503 is one scaled upward until the flower 517 fills nearly the entire viewing region 600. Occlusion cost generator 330 calculates a low occlusion cost for layout orientation 1400, because no salient portions are of image 501 are occluded, and because a large amount of saliency (i.e. the flower 517) is displayed across the viewing region 600. Layout orientation 1400 is reached by passively or actively determining the occlusion cost for multiple trial layouts and selecting the best layout with the cost minimization engine 340. In other embodiments of the present invention, layout orientation 1400 is reached by utilizing feedback, as previously described, from cost minimization engine 340 to actively steer layout orientation generator 304 toward layout orientation 1400 with layout orientation constraint controller 325.

Embodiments of the present invention are thus described. While the present invention has been described in particular embodiments, it should be appreciated that the present invention should not be construed as limited by such embodiments, but rather construed according to the following claims.

What is claimed is:

1. A computer-implemented method for determining an occlusion cost for concurrently presenting multiple images within a shared viewing region, said method comprising:
   receiving image saliency data for a first image to be displayed concurrently with a second image in said shared viewing region;
   receiving image saliency data for said second image;
   receiving a layout orientation for concurrently presenting said first image and said second image within said shared viewing region; and
   utilizing said image saliency data for said first image and said image saliency data for said second image to determine the occlusion cost of said layout orientation for concurrently presenting said first image and said second image within said shared viewing region.

2. The computer-implemented method as recited in claim 1 wherein said method for determining an occlusion cost for concurrently presenting multiple images within a shared viewing region comprises determining said occlusion cost for concurrently presenting said multiple images within a shared electronic display.

3. The computer-implemented method as recited in claim 1 wherein said method for determining an occlusion cost for concurrently presenting multiple images within a shared viewing region comprises determining said occlusion cost for concurrently presenting said multiple images within a shared projected display.

4. The computer-implemented method as recited in claim 1 wherein said method for determining an occlusion cost for concurrently presenting multiple images within a shared viewing region comprises determining said efficient layout for concurrently presenting said multiple images within a shared print media.

5. The computer-implemented method as recited in claim 1 wherein said receiving image saliency data for said first image comprises receiving a saliency map of said first image.

6. The computer-implemented method as recited in claim 1 wherein said receiving image saliency data for said second image comprises receiving a saliency map of said second image.

7. The computer-implemented method as recited in claim 1 wherein said receiving image saliency data for said first image comprises receiving image saliency data for said first image generated according to user-specified parameters.

8. The computer-implemented method as recited in claim 1 wherein said receiving image saliency data for said second image comprises receiving image saliency data for said second image generated according to user-specified parameters.

9. The computer-implemented method as recited in claim 1 wherein said receiving a layout orientation comprises receiving a plurality of layout orientations for concurrently presenting said first image and said second image within said shared viewing region.

10. The computer-implemented method as recited in claim 9 wherein said receiving a plurality of layout orientations comprises receiving said plurality of layout orientations generated according to user-specified constraints.

11. The computer-implemented method as recited in claim 9 wherein said utilizing said image saliency data for said first image and said image saliency data for said second image to determine the occlusion cost of said layout orientation for concurrently presenting said first image and said second image within said shared viewing region comprises utilizing said image saliency data for said first image and said image saliency data for said second image to determine respective occlusion costs for said plurality of layout orientations.

12. The computer-implemented method as recited in claim 11 wherein said utilizing said image saliency data for said first image and said image saliency data for said second image to determine respective occlusion costs for said plurality of layout orientations further comprises choosing a lowest occlusion cost layout from said respective occlusion costs.

13. The computer-implemented method as recited in claim 1 wherein said receiving a layout orientation for concurrently presenting said first image and said second image within said shared viewing region comprises:
receiving a layout orientation in which said first image has an image area which can be varied;
receiving a layout orientation in which said second image has an image area which can be varied; and
receiving a layout orientation in which said image viewing region has an area which can be varied.

14. A computer-readable storage medium having computer-executable program code stored thereon for causing a computer system to execute a method for determining an occlusion cost for concurrently presenting multiple images within a shared viewing region, said method comprising:
receiving image saliency data for a first image to be displayed concurrently with a second image in said shared viewing region;
receiving image saliency data for said second image;
receiving a layout orientation for concurrently presenting said first image and said second image within said shared viewing region; and
utilizing said image saliency data for said first image and said image saliency data for said second image to determine the occlusion cost of said layout orientation for concurrently presenting said first image and said second image within said shared viewing region.

15. The computer-readable storage medium of claim 14 further comprising computer-executable program code for causing said computer system to determine said occlusion cost for concurrently presenting said multiple images within a shared electronic display.

16. The computer-readable storage medium of claim 14 further comprising computer-executable program code for causing said computer system to determine said occlusion cost for concurrently presenting said multiple images within a shared projected display.

17. The computer-readable storage medium of claim 14 further comprising computer-executable program code for causing said computer system to determine said occlusion cost for concurrently presenting said multiple images within a shared print media.

18. The computer-readable storage medium of claim 14 wherein said receiving image saliency data for said first image comprises computer-executable program code for causing said computer system to receive a saliency map of said first image.

19. The computer-readable storage medium of claim 14 wherein said receiving image saliency data for said second image comprises computer-executable program code for causing said computer system to receive a saliency map of said second image.

20. The computer-readable storage medium of claim 14 wherein said receiving image saliency data for said first image comprises computer-executable program code for causing said computer system to receive image saliency data for said first image generated according to user-specified parameters.

21. The computer-readable storage medium of claim 14 wherein said receiving image saliency data for said second image comprises computer-executable program code for causing said computer system to receive image saliency data for said second image generated according to user-specified parameters.

22. The computer-readable storage medium of claim 14 wherein said receiving a layout orientation comprises computer-executable program code for causing said computer system to receive a plurality of layout orientations for concurrently presenting said first image and said second image within said shared viewing region.

23. The computer-readable storage medium of claim 22 wherein said receiving a plurality of layout orientations comprises computer-executable program code for causing said computer system to receive said plurality of layout orientations generated according to user-specified constraints.

24. The computer-readable storage medium of claim 22 wherein said utilizing said image saliency data for said first image and said image saliency data for said second image to determine the occlusion cost of said layout orientation for concurrently presenting said first image and said second image within said shared viewing region comprises computer-executable program code for causing said computer system to utilize said image saliency data for said first image and said image saliency data for said second image to determine respective occlusion costs for said plurality of layout orientations.

25. The computer-readable storage medium of claim 24 wherein said utilizing said image saliency data for said first image and said image saliency data for said second image to determine respective occlusion costs for said plurality of layout orientations comprises computer-executable program code for causing said computer system to choose a lowest occlusion cost layout from said respective occlusion costs.

26. The computer-readable storage medium of claim 14 wherein said receiving a layout orientation for concurrently presenting said first image and said second image within said shared viewing region comprises computer-executable program code for causing said computer system to:
- receive a layout orientation in which said first image has an image area which can be varied;
- receive a layout orientation in which said second image has an image area which can be varied; and
- receive a layout orientation in which said image viewing region has an area which can be varied.

27. A computer-implemented method for determining an occlusion cost for presenting an image within a viewing region, said method comprising:
- receiving image saliency data for said image to be presented within said viewing region;
- receiving a layout orientation for presenting said image within said viewing region; and
- utilizing said image saliency data for said image to determine the occlusion cost of said layout orientation for presenting said image within said viewing region.

28. The computer-implemented method as recited in claim 27 wherein said method for determining an occlusion cost for presenting an image within a viewing region comprises determining said occlusion cost for presenting said image within an electronic display.

29. The computer-implemented method as recited in claim 27 wherein said method for determining an occlusion cost for presenting an image within a viewing region comprises determining said occlusion cost for presenting said image within a projected display.

30. The computer-implemented method as recited in claim 27 wherein said method for determining an occlusion cost for presenting an image within a viewing region comprises determining said occlusion cost for presenting said image within a print media.

31. The computer-implemented method as recited in claim 27 wherein said receiving image saliency data for said image comprises a saliency map of said image.

32. The computer-implemented method as recited in claim 27 wherein said receiving image saliency data for said first image comprises receiving image saliency data for said first image generated according to user-specified parameters.

33. The computer-implemented method as recited in claim 27 wherein said receiving a layout orientation comprises receiving a plurality of layout orientations for presenting said image within said viewing region.

34. The computer-implemented method as recited in claim 33 wherein said receiving a plurality of layout orientations comprises receiving said plurality of layout orientations generated according to user-specified constraints.

35. The computer-implemented method as recited in claim 33 wherein utilizing said image saliency data for said image to determine the occlusion cost of said layout orientation for presenting said image within said viewing region comprises utilizing said image saliency data for said image to determine respective occlusion costs for said plurality of layout orientations.

36. The computer-implemented method as recited in claim 35 wherein said utilizing said image saliency data for said image to determine respective occlusion costs for said plurality of layout orientations further comprises choosing a lowest occlusion cost layout from said respective occlusion costs.

37. The computer-implemented method as recited in claim 27 wherein said receiving a layout orientation for presenting said image within said viewing region comprises:
- receiving a layout orientation in which said image has an image area which can be varied; and
- receiving a layout orientation in which said image viewing region has an area which can be varied.

38. An apparatus for determining an occlusion cost for concurrently presenting multiple images within a shared viewing region, said method comprising:
- an image saliency receiver;
- a layout orientation receiver coupled to said image saliency receiver; and
- an occlusion cost generator coupled to said layout orientation receiver, said occlusion cost generator for determining an occlusion cost for concurrently presenting said multiple images within said shared viewing region.

39. The apparatus of claim 38 further comprising:
- an occlusion cost minimization engine coupled to said occlusion cost generator.

40. The apparatus of claim 38 further comprising:
- an image saliency generator controller coupled to said image saliency receiver.

41. The apparatus of claim 38 further comprising:
- a layout orientation constraint controller coupled to said layout orientation receiver.

42. The apparatus of claim 38 further comprising:
- an image saliency generator controller coupled to said image saliency receiver, wherein said image saliency generator controller incorporates user adjustable image saliency constraints; and a layout orientation constraint controller coupled to said layout orientation receiver, wherein said layout orientation constraint controller incorporates user adjustable layout orientation constraints.

* * * * *